United States Patent [19]
Sabolic

[11] 3,821,634
[45] June 28, 1974

[54] EXTERNALLY REGULATED POWER PHASE CONTROL CIRCUIT

[75] Inventor: Dabravko F. Sabolic, Akron, Ohio

[73] Assignee: Tony Construction, Inc., County of Summit, Ohio

[22] Filed: Oct. 2, 1972

[21] Appl. No.: 294,477

[52] U.S. Cl. ......... 323/24, 307/252 B, 307/252 UA, 323/36, 323/38
[51] Int. Cl. ............................................. G05f 1/44
[58] Field of Search ............. 323/22 SC, 24, 34–36, 323/38; 307/252 B, 252 N, 252 T, 252 UA

[56] References Cited
UNITED STATES PATENTS

| | | |
|---|---|---|
| 3,333,112 | 7/1967 | Vercellotti ........................... 323/24 |
| 3,383,623 | 5/1968 | Vercellotti et al. ............. 307/252 T |
| 3,535,615 | 10/1970 | Howell et al. ................... 323/22 SC |
| 3,593,112 | 7/1971 | Coats ................................... 323/24 |
| 3,609,515 | 9/1971 | Babcock et al. ................. 323/24 X |
| 3,660,686 | 5/1972 | Muskovac ..................... 307/252 N |
| 3,721,894 | 3/1973 | Beckwith ......................... 323/24 X |

*Primary Examiner*—Gerald Goldberg
*Attorney, Agent, or Firm*—Oldham & Oldham Co.

[57] ABSTRACT

An electrical circuit is disclosed whereby power phase control may be uniquely achieved in correlation with any of numerous external control sources. A timing circuit is utilized in conjunction with a diac-triac power control circuit to achieve the desired regulation. An external programmed signal source provides predetermined signals to achieve control of the timing circuit. Consequently, the external programmed signal source directly affects the degree of power regulation of the diac-triac control circuit.

2 Claims, 5 Drawing Figures

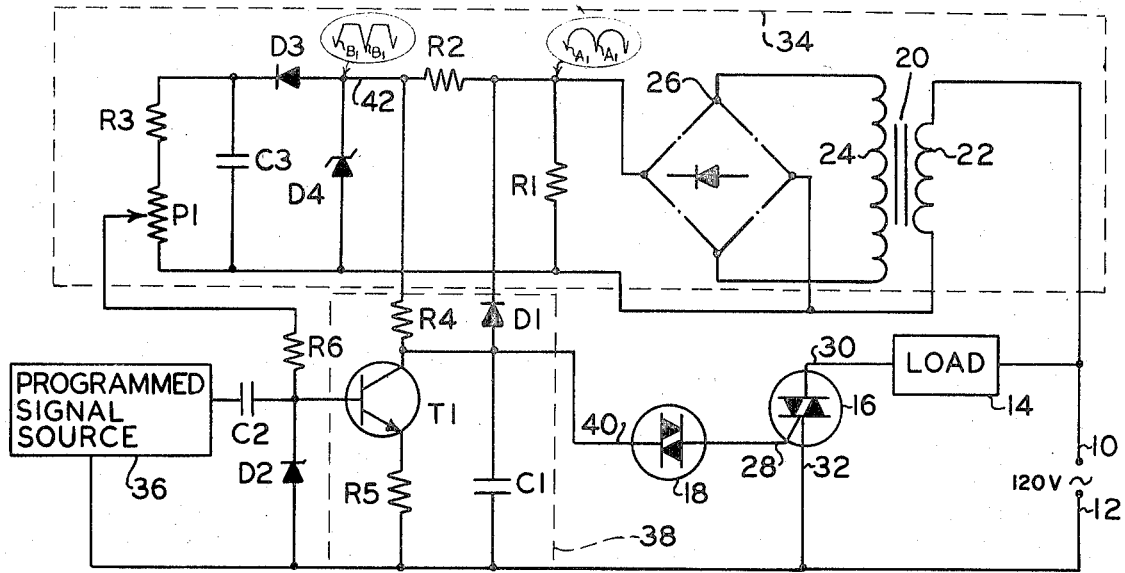
FIG-1
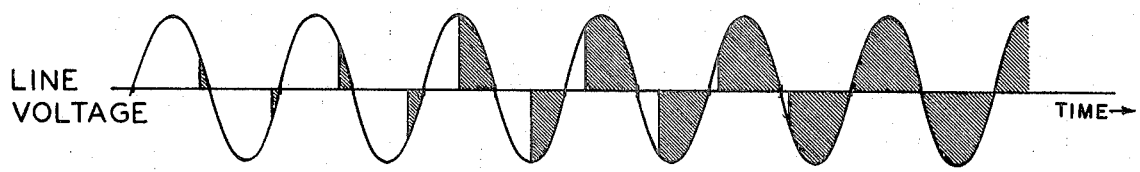
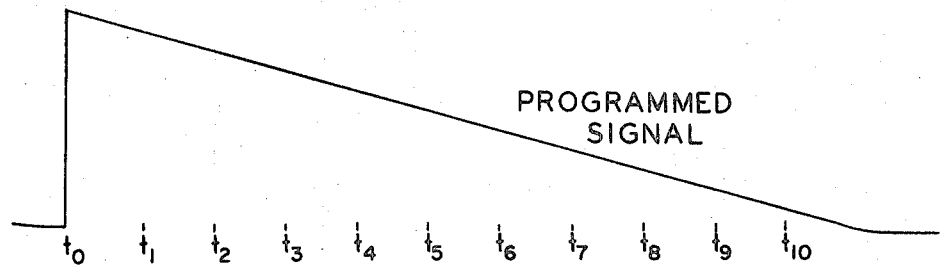
FIG-2
FIG-3
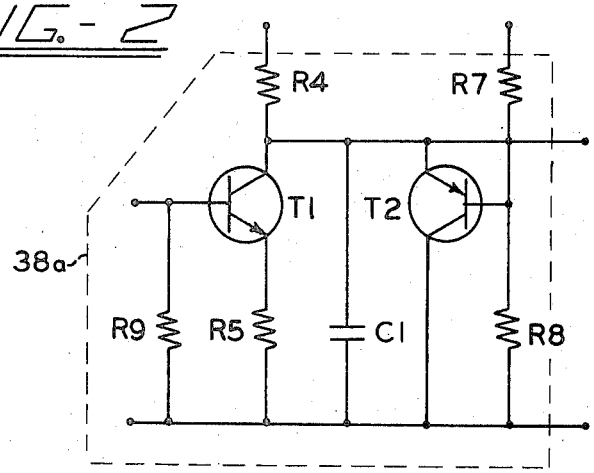

EXTERNALLY REGULATED POWER PHASE CONTROL CIRCUIT

BACKGROUND OF THE INVENTION

Heretofore it has been known that certain problems exist when electrical motors are initially turned on. Great current surges, or transients, are experienced in the motor windings due to the high inductance thereof. It is well understood that such current surges are undesirable since they have detrimental affects upon the motor windings and must also be considered when selecting the power sources necessary for supplying current to the motors. Various attempts have been made to alleviate this current surge problem. The most commonly known approach to the solution has been the utilization of complex circuitry comprising transistors and SCR's which, under the control of the back EMF generated by the motor itself, control the power supplied to the motor windings. Such circuits have generally proven undesirable since they must be complex in nature to overcome the unidirectional conductivity of SCR's. They have further proven to be very inflexible since control of the circuitry is directly dependent upon the back EMF generated by the motor controlled.

A further problem has been known to exist with the thermal electric shock experienced by filaments of electric lights when initially turned on. It is well known that the life of such filaments decreases exponentially in relation with the voltage applied thereto. Consequently, it is desirable to gradually rather than instantaneously apply voltage to such filaments so as to greatly increase their life. The most commonly known method of such control is by means of "light dimmers" which comprise nothing more than a rheostat in series with the line voltage. There appear to have been few attempts to design means whereby such control could be automatically achieved.

It has further been known that illuminated signs such as those used for advertising purposes might be controlled by means of electro-mechanical interrupter circuits. Such circuits provide means for controlling the illumination of various banks of lights in an electric sign so as to achieve a blinking or flashing sensation. Such signs, as presently known, utilize electro-mechanical means to achieve the turn on — turn off relationship between the various banks of lights. Such systems today comprise networks of electro-mechanical apparatus which are susceptible to mechanical failures and wear-out.

It is therefore an object of the instant invention to provide a universal circuit, susceptible to external control, which may provide power regulation for electrical apparatus in accordance with predetermined electrical signals.

It is a further object of the instant invention to present a circuit which may be utilized not only for the control of power surges experienced in turn on, the prevention of thermal-electrical shock in electric light turn on, and the total automatic electrical control of illuminated signs, but also to provide a circuit which may be readily adaptable for any of numerous other uses.

It is a further object of the instant invention to provide such a control circuit which is consistently accurate in operation, inexpensive to build, and simplistic nature.

These objects and other objects which will become apparent as the description proceeds are achieved by a circuit for regulating the electrical power from an A.C. line voltage to a load, comprising: a D.C. generating circuit connected to the line voltage creating a preselected D.C. voltage; a timing circuit connected to the D.C. generating circuit, receiving an electrical charge from the D.C. generating circuit at a predetermined rate and discharging that charge at a predetermined time; a diac-triac power control circuit connected to the timing circuit and the load, regulating the power to the load in accordance with the rate of charge of the timing circuit; and a programmed signal source connected to the timing circuit, affecting the predetermined rate of charge of the timing circuit in accordance with the dictates of a dynamically changing pulse emitted therefrom.

For a complete understanding of the apparatus and functioning of the instant invention reference should be had to the accompanying drawings wherein:

FIG. 1 is a schematic diagram showing of the preferred embodiment of the invention;

FIG. 2 illustrates the interrelationships between the line voltage, the programmed signal, and the power dissipated in the load;

FIG. 3 is a schematic diagram of a timing circuit which is both temperature insensitive and capable of instantaneous discharge of the timing capacitor at every half cycle of the line voltage;

Figure 4:
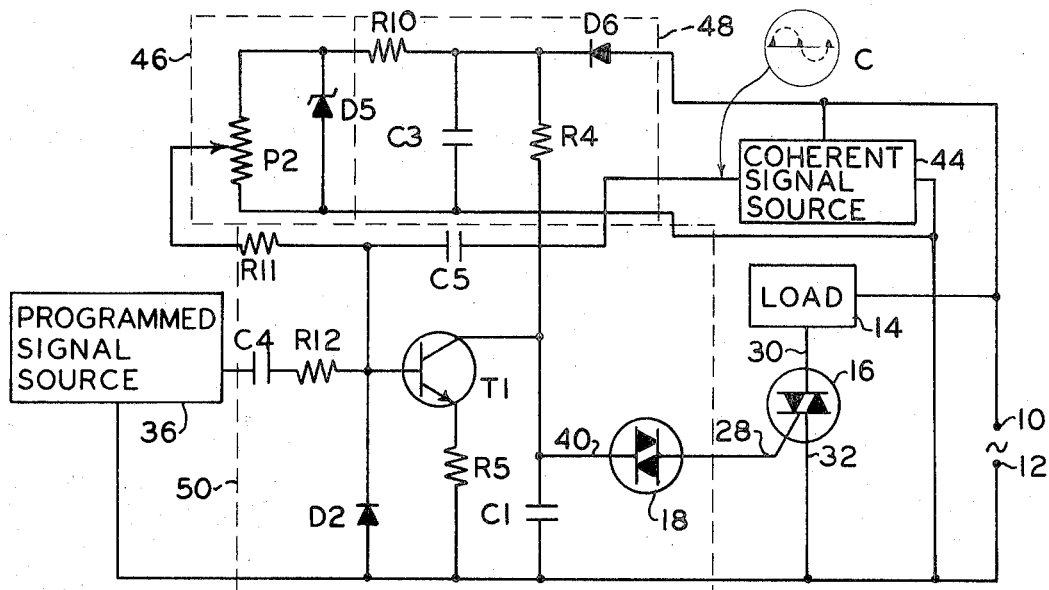
FIG. 4 is a schematic diagram of the preferred embodiment of the invention wherein a transformer and full wave rectifying bridge have been replaced with a coherent signal source.

Referring now to the drawings, and more particularly FIG. 1, it can be seen that a load 14 is to be affected by an A.C. line voltage connected to the terminals 10 and 12. A triac 16 is in series connection with the power source and the load 14. As is well understood by those skilled in the art, a triac is the A.C. semiconductor switch equivalent of a triode. The triac 16 is caused to conduct when a particular potential difference exists between the terminal electrodes 30 and 32 and a gating signal is applied to the gate electrode 28. Once gated, the triac will continue to conduct until the potential difference between the terminal electrodes 30 and 32 approaches zero. Consequently, in conducting A.C. current the triac 16 must be gated during every half cycle in order to guarantee the conduction of current during each half cycle. It can be seen then that the A.C. power to the load 14 may be totally regulated by means of control of the gating signals incident to the gate electrode 28. These gating signals are controlled by means of the diac 18, such control being well known and understood by those skilled in the art.

It should be understood then that the conductivity of the triac 16 and consequently the power regulation to the load 14 is directly dependent upon the control signal transmitted by the diac 18. The creation of this signal presents a novel aspect of the instant invention. Fundamentally, this control signal is created by means of the interrelationships of the D.C. generating circuit 34, the programmed signal source 36, and the timing circuit 38. These interrelationships will become apparent from the thorough discussion of each of the three elements presented directly hereinafter.

The D.C. generating circuit 34 comprises a transformer 20 which receives on its primary winding 22 the A.C. signal incident to the terminals 10 and 12. The secondary winding 24 of the transformer 20 passes the A.C. signal to the full wave rectifier bridge 26. The full wave rectified signal A passes through the resistor R2 and is clamped at an appropriate level by the zener diode D4. The signal is further smoothed and the ripple eliminated by means of the capacitor C3, the resistor R3, and the potentiometer P1. The diode D3 is, of course, utilized for purposes of isolation.

Although any of numerous transformers may be used for the transformer 20, it is contemplated that a step-up transformer be used. A step-up transformer will result in a higher peak voltage in the full wave rectified signal A. Consequently, the rise time of such signal will be faster and the ramps B1 of the clipped full wave rectified signal B will be steeper. As will become apparent hereinafter, the degree of power regulation which may be achieved by the instant invention is directly related to this rise time.

The timing circuit 38 directly controls the triggering of the diac 18 and consequently the degree of conductivity of the triac 16. The voltage on the terminal 40 of the diac 18 will be equivalent to the voltage to which the capacitor C1 is charged. When the capacitor C1 is charged to a voltage sufficient to trigger the diac 18 then the diac 18 will correspondingly gate the triac 16 into conduction. The charging of the capacitor C1 is effectuated by the passage of current from the line 42 through the resistor R4. If the transistor T1 is in a non-conducting state then the rate of charge of the capacitor C1 is totally dependent upon the R.C. time constant between R4 and C1. However, if T1 is conducting then the rate of charge of the capacitor C1 is diminished. Consequently, it can be seen that the rate of charge of the capacitor C1 may be totally controlled by means of the transistor T1. Any degree of power regulation may therefore be obtained by applying the proper biasing voltage to the base of the transistor T1. As will become more apparent hereinafter, the biasing voltage may be either a D.C. voltage created by the adjustment of the potentiometer P1 or it may constitute a dynamic signal from the programmed signal source 36.

A unique aspect of the instant invention is the discharge of the capacitor C1 at the end of every half cycle of the line voltage. Each time the full wave rectified signal A approaches ground at A1 the diode D1 becomes forward biased so as to allow the capacitor C1 to discharge through the resistor R1. Thus the capacitor C1 is discharged to the same state at the beginning of each half cycle of the line voltage. This guarantees an accurate and reliable degree of power regulation. Of course, in this situation, the resistor R1 must be chosen with due regard given to power dissipation and the discharge time required due to the time constant created between R1 and C1.

The programmed signal source 36 provides the means whereby external control of the power regulation may be achieved. It should be understood from the discussion hereinabove that the power regulation achieved by this circuit may be totally affected by the conductivity of the transistor T1. By properly selecting a programmed signal for the programmed signal source 36 and coupling that signal across the coupling capacitor C2 to the base of the transistor T1 any of numerous degrees of power regulation may be achieved.

FIG. 2 illustrates the relationships between the programmed signal, the line voltage, and the power dissipation of the load 14. At the time $t0$ the programmed signal rapidly rises to a peak and then decays to its original state at the time $t10$ by means of a ramp function. This signal is coupled across the capacitor C2 to the base of the transistor T1. The darkened portions of the line voltage signal illustrate that period of the line voltage during which power is dissipated in the load 14. It can be seen that during the first half cycle, from $t0$ to $t1$, transistor T1 is biased into a highly conductive state such that the capacitor C1 reaches the firing level of the diac 18 very late in that half cycle and consequently very little power is dissipated in the load 14. In the second half cycle, from $T1$ to $T2$, the programmed signal has diminished and the transistor T1 has been biased so as to be less conductive. Consequently, the capacitor C1 charges more rapidly to the firing level of the diac 18 so that during this half cycle slightly more power is dissipated in the load 14. It is to be particularly noted that at the end of each half cycle of the line voltage the capacitor C1 is discharged through the diode D1 and the resistor R1 so as to initialize the capacitor C1 at the same level for each half cycle of the line voltage. This process continues until at time $t10$ the transistor T1 is gated into a totally non-conductive state such that the capacitor C1 almost instantaneously reaches the firing level of the diac 18 at the beginning of each half cycle of the line voltage.

With the transistor T1 totally non-conductive the rate of charge of the capacitor C1 is critically dependent upon the ramp rate B1 of the clipped voltage B. It is for this reason that the preferred embodiment teaches the utilization of a step-up transformer such that this ramp will be steep and very little time will be lost in reaching peak voltage on the line 42 such that the capacitor C1 may be almost instantaneously charged. If the ramp B1 is steep enough then it will be possible to achieve over 95 percent power dissipation to the load 14 when the transistor T1 is gated off.

A long ramp voltage as illustrated in FIG. 2 would of course serve the purposes of regulating the turn-on power of electric motors, or lights. It should be understood of course that any of numerous programmed signals would be adaptable for use in the instant circuit. If the instant invention were to be utilized in the automatic control of illuminated signs then it is to be understood that the programmed signals would be a constantly changing signal affecting the load which would constitute a bank of lights. It is to be further understood that if a constant degree of power regulation is desired then no external programmed signal is necessary but the potentiometer P1 may be adjusted so as to place the proper biasing voltage at the base of the transistor T1.

It should further be briefly noted that the diode D2 is connected across the base emitter junctions of the transistor T1 so as to prevent severe reverse biasing of that junction resulting from the coupling of signals across the capacitor C2.

A slight variation of the timing circuit 38 is shown in FIG. 3 and designated by the broken box 38a. This box would have exactly the same orientation in the circuit as the box 38 illustrated in FIG. 1. That is, all the lines entering and leaving the box 38a would be identical to those lines entering and leaving the box 38. It can be seen that two variations have been made in the timing circuit 38a. Particularly, a reistor R9 has been added at the base of the transistor T1 and connected to ground. The presence of the resistor R9 creates a voltage divider comprising R6 and R9 so as to guarantee a fixed voltage at the base of the transistor T1. This voltage divider has the tendency of causing the current gain of the transistor T1 to be insensitive to ambient temperature changes. Consequently accurate and consistent operation of the circuit may be guaranteed independent of adverse changes of ambient temperature. This characterisitc is of extreme importance when the instant invention is to be utilized in the control of illuminated signs since such signs radiate extremely large amounts of heat.

Further, the timing circuit 38a contemplates the replacement of the discharging diode D1 with the combination of the transistor T2 and the resistors R7 and R8. When the timing circuit 38a is utilized the resistor R1, illustrated in FIG. 1, would be removed. The discharging of the capacitor C1 would then be achieved through the transistor T2. Hence the discharge to the capacitor C1 is no longer characterized by the RC time constant of capacitor C1 and resistor R1 but will be instantaneously discharged through the transistor T2 at every half cycle of the line voltage. This method of discharge guarantees a more rapid and a more complete discharge of the capacitor C1. While the timing circuit 38 is more simplistic, the timing circuit 38a would be preferable in heated environment situations.

A slight variation of the theme of the circuitry of the instant invention is illustrated in FIG. 4. Like elements have retained the same designations as the elements in the circuitry of FIG. 1. This circuit operates in much the same manner as that illustrated in FIG. 1 but the requirement of a transformer has been alleviated. Here the line voltage incident to the terminals 10 and 12 is half wave rectified and smoothed by means of the diode D6, the capacitor C3, and the resistor R10. This D.C. level is then clamped by means of the zener diode D5. The potentiometer P2 may be utilized to adjust the biasing voltage on the base of the transistor T1, the biasing of which again affects the rate of charge of the capacitor C1 and consequently the power regulation achieved by the triac 16. A predetermined signal from the programmed signal source 36 may be coupled across the capacitor C4 to the base of the transistor T1 so as to affect the power regulation in any of numerous manners. Since the transformer 20 and the full wave rectifying bridge 26 have been dispensed with, a coherent signal source 44 is provided for the creation of discharging spikes at each half cycle of the line voltage. These spikes are illustrated by the signal illustration C. These spikes couple across the capacitor C5 to bias the base of the transistor T1 so as to cause rapid discharge of the capacitor C1 through the resistor R5 at each half cycle of the line voltage. This discharge, as in the previous circuit, provides for accurate initialization of the circuitry. All of the other aspects of the circuitry of FIG. 1 are applicable to the circuitry illustrated in FIG. 4.

Figure 5:
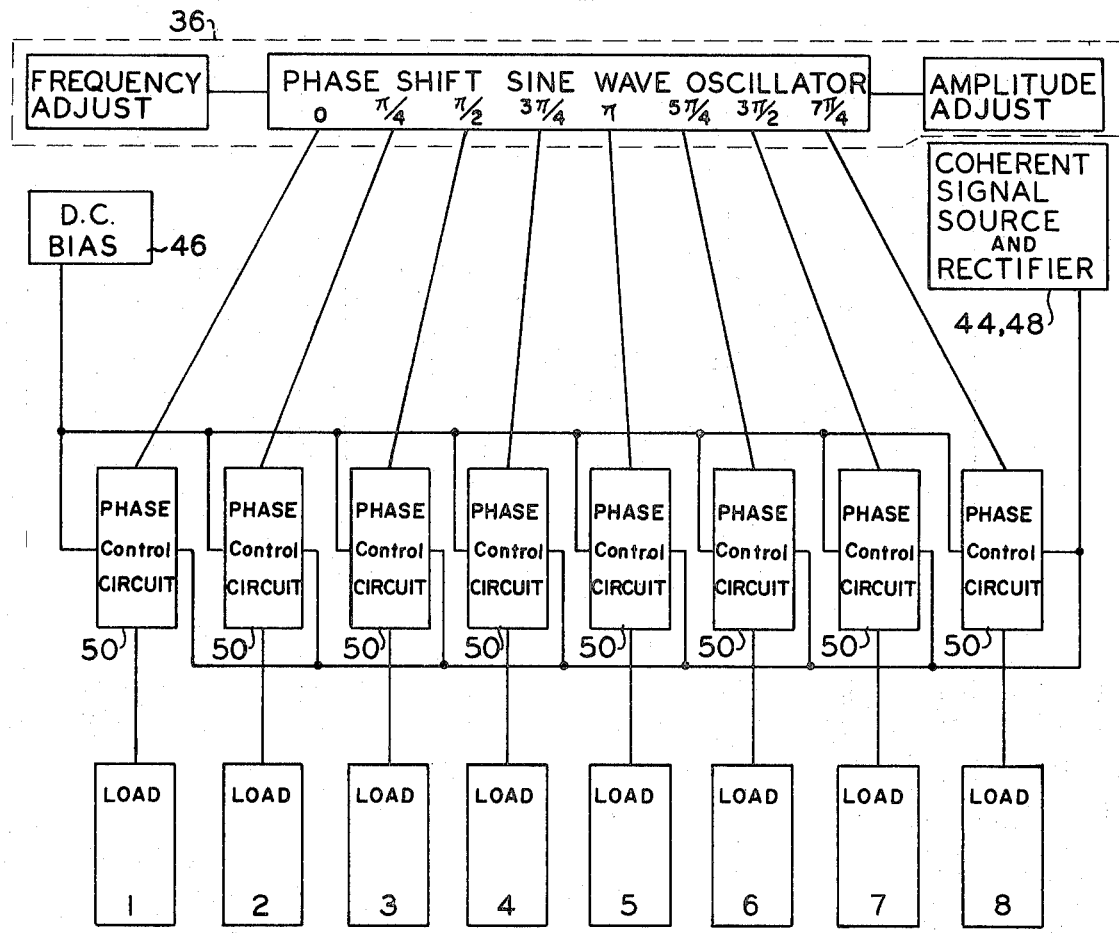
FIG. 5 is a block showing of an intended utilization of the invention.

It can be seen then that the apparatus of the instant invention essentially comprises a D.C. bias circuit 46, a rectifier 48, a coherent signal source 44, a programmed signal source 36, and a phase control circuit 50. With these essential elements under consideration, reference should be had to FIG. 5 wherein an illustration of the utilization of the instant invention for controlling illuminated signs may be seen. Here a plurality of individual banks of lights, loads 1 through 8, are connected to their respective phase control circuits 50. Each of the phase control circuits 50 is connected to a single D.C. bias circuit 46 and coherent signal source and rectifier 44, 48 all of which operate under control of the line voltage as discussed hereinabove. The programmed signal source 36 is, in this case, a phase shift sine wave oscillator. Each of the phase control circuits 50 receives a sine wave as a control input signal which is 45° out of phase with the previous phase control circuit. If the sine wave oscillator 52 has a cycle time extremely slower than that of the line voltage then it can be appreciated that, in accordance with the teachings of the instant invention, each of the loads 1 through 8 will be experiencing a different degree of power regulation at any given point in time. Consequently, the banks of lights illustrated as loads 1 through 8 can be caused to give a flashing or dancing affect in an illuminated sign. This of course is only one of numerous applications of the circuitry comprising the instant invention.

The flexibility of the circuitry of the instant invention should readily be apparent. It is to be understood that the phase control circuit 50 may be utilized to control electrical apparatus operating on line voltages different from the commonly utilized 120 volts, and at frequencies varying from the commonly known 60 CPS. Similarly, it is to be understood that the instant invention may be utilized to control polyphase electrical apparatus. Specifically, a three phase apparatus, whether connected in delta or Y, may be controlled by the instant circuitry. It would of course be apparent to one skilled in the art that one phase control circuit 50 would have to be associated with each of the phases of the load being controlled. Of course, each of the phase control circuits 50 would be capable of utilizing the same DC bias 46 and programmed signal source 36.

Thus it can be seen that the objects of the instant invention have been met by the circuitry described and illustrated herein. While in accordance with the patent statutes only the best known and preferred embodiments of the instant invention have been presented and described in detail, it is to be understood that the instant invention is not limited thereto or thereby. For a comprehension of the true scope of the instant invention reference should therefore be had to the appended claims.

What is claimed is:

1. A circuit for regulating the electrical power from an AC line voltage to a load, comprising:
a step-up transformer connected to the AC line amplifying the line voltage and thereby providing an output wave form wherein the individual cycles have faster rise and fall times than those of the line voltage;
a full wave rectifier receiving and rectifying the output from the transformer and passing a full rectified signal to a clamping zener diode and thence to a capacitor and resistor network wherein the clamped full wave rectified signal from the zener diode is smoothed into a stable DC level;
a timing circuit interconnected between the zener diode and the capacitor and resistor network including a resistor series connected to a timing capacitor and a transistor in shunt with the timing capacitor, the transistor controlling the rate of charge of the timing capacitor according to its degree of conductivity;

a diac-triac power control circuit connected to the timing circuit and the load for regulating the power to the load in accordance with the rate of charge of the timing capacitor;

a diode interconnected between the full wave rectifier and the timing capacitor and providing a discharge path for the timing capacitor at the end of each half cycle of the line voltage;

a program signal source coupled to the transistor and applying a dynamically changing pulse thereto for controlling the conductivity of the transistor; and variable DC biasing means interconnected between the transistor and the capacitor and resistor network to control the conductivity of the transistor.

2. A circuit for regulating the electrical power from an AC line voltage to a load, comprising:

a step-up transformer connected to the AC line amplifying the line voltage and thereby providing an output wave form wherein the individual cycles have faster rise and fall times than those of the line voltage;

a full wave rectifier receiving and rectifying the output from the transformer and passing a full rectified signal to a clamping zener diode and thence to a capacitor and resistor network wherein the clamped full wave rectified signal from the zener diode is smoothed into a stable DC level;

a timing circuit interconnected between the zener diode and the capacitor and resistor network and including a resistor series connected to a timing capacitor and a first transistor in shunt with the timing capacitor, the first transistor controlling the rate of charge of the timing capacitor according to its degree of conductivity;

a diac-triac power control circuit connected to the timing circuit and the load for regulating the power to the load in accordance with the rate of charge of the timing capacitor;

a second transistor in shunt with the timing capacitor and operatively connected to and receiving a full wave rectified signal from the rectifier and providing a discharge path for the timing capacitor at the end of each half cycle of the line voltage and wherein the first transistor is rendered temperature insensitive by means of a voltage divider network connected to the base thereof; and variable DC biasing means interconnected between the first transistor and the capacitor and resistor network to further control the conductivity of the first transistor.

* * * * *